United States Patent
Lee et al.

(10) Patent No.: US 8,414,186 B2
(45) Date of Patent: Apr. 9, 2013

(54) PURE SILICA CORE MULTIMODE FIBER SENSORS FOR DTS APPLICATIONS

(75) Inventors: Chung Lee, Austin, TX (US); Kwang Suh, Lakeway, TX (US); Mahesh Ajgaonkar, Buda, TX (US); Kent Kalar, Austin, TX (US)

(73) Assignee: SensorTran, Inc., Austin, TX (US)

( * ) Notice: Subject to any disclaimer, the term of this patent is extended or adjusted under 35 U.S.C. 154(b) by 0 days.

(21) Appl. No.: 12/451,866

(22) PCT Filed: Jul. 18, 2008

(86) PCT No.: PCT/US2008/008785
§ 371 (c)(1),
(2), (4) Date: Dec. 3, 2009

(87) PCT Pub. No.: WO2009/014649
PCT Pub. Date: Jan. 29, 2009

(65) Prior Publication Data
US 2010/0103978 A1    Apr. 29, 2010

Related U.S. Application Data

(60) Provisional application No. 60/951,081, filed on Jul. 20, 2007.

(51) Int. Cl.
*G01K 1/00* (2006.01)
*G01K 3/06* (2006.01)
*G01J 5/08* (2006.01)
*G02B 6/036* (2006.01)

(52) U.S. Cl.
USPC ............ 374/130; 374/131; 374/161; 374/45; 374/208; 374/137; 356/43

(58) Field of Classification Search .................. 385/123, 385/124, 127, 142, 12, 38, 5, 132, 24, 28, 385/13, 125, 126, 31, 141, 143, 145, 131, 385/144; 374/29, 30, 137, 110, 112, 114, 374/115, 166, 167, 100, 120, 130, 136, 141, 374/142, 147, 148, 131, 161, 135, 45, 208; 356/43; 257/227.14
See application file for complete search history.

(56) References Cited

U.S. PATENT DOCUMENTS

| | | | |
|---|---|---|---|
| 4,163,601 A | | 8/1979 | Olshansky |
| 4,236,786 A | | 12/1980 | Keck |
| 4,302,970 A | * | 12/1981 | Snitzer et al. ............. 374/161 |
| 4,327,963 A | * | 5/1982 | Khoe et al. ................ 385/35 |
| 4,342,907 A | * | 8/1982 | Macedo et al. ........ 250/227.14 |
| 4,676,594 A | | 6/1987 | Presby |
| 4,974,930 A | | 12/1990 | Blyler, Jr. |
| 5,096,277 A | * | 3/1992 | Kleinerman ............... 385/12 |
| 5,627,934 A | | 5/1997 | Muhs |
| 5,940,567 A | | 8/1999 | Garito |

(Continued)

*Primary Examiner* — Gail Verbitsky
(74) *Attorney, Agent, or Firm* — Michael A. Ervin; John W. Wustenberg; Kreuger Iselin LLP

(57) ABSTRACT

A new step-index multimode pure silica core fiber for DTS (Distributed Temperature Sensing) system particularly useful for downhole environments is disclosed and described. The new sensor system provides optimum tradeoffs between coupling power, spatial resolution, and temperature resolution.

3 Claims, 1 Drawing Sheet

U.S. PATENT DOCUMENTS

| | | |
|---|---|---|
| 6,434,309 B1 | 8/2002 | Abbott, III |
| 6,438,303 B1 | 8/2002 | Abbott, III |
| 6,511,222 B1 * | 1/2003 | Bouamra ............... 374/161 |
| 6,574,403 B1 | 6/2003 | Golowich |
| 6,724,965 B2 | 4/2004 | Abbott, III |
| 6,798,962 B2 | 9/2004 | Berkey |
| 6,873,775 B2 | 3/2005 | Jang |
| 7,284,903 B2 * | 10/2007 | Hartog ................... 374/130 |
| 7,762,720 B1 * | 7/2010 | Zhu et al. .............. 374/131 |
| 7,773,847 B2 * | 8/2010 | Negishi et al. ......... 385/127 |
| 2009/0310642 A1 * | 12/2009 | Skinner ..................... 374/1 |
| 2010/0329618 A1 * | 12/2010 | Dong et al. ............ 385/127 |
| 2011/0141555 A1 * | 6/2011 | Fermann et al. ...... 359/341.3 |
| 2012/0039361 A1 | 2/2012 | Gooijer et al. ........ 374/161 |
| 2012/0092651 A1 * | 4/2012 | Molin et al. ........... 356/73.1 |
| 2013/0004135 A1 * | 1/2013 | Bigot-Astruc et al. ....... 385/126 |

* cited by examiner

PURE SILICA CORE MULTIMODE FIBER SENSORS FOR DTS APPLICATIONS

CROSS REFERENCE TO RELATED APPLICATIONS

This application claims the benefit of U.S. provisional Ser. No. 60/951,081, filed Jul. 20, 2007 by the present inventors.

FIELD OF THE INVENTION

The present invention relates to fiber optic distributed temperature sensors and particularly to a new class of DTS sensors especially useful in downhole applications with hydrogen environments.

BACKGROUND OF THE INVENTION

Distributed Temperature Sensing (DTS) sensors using optical fibers have been known for more than 20 years. The technology has evolved over the years and moved from the laboratory environment into the field in numerous applications, e.g. down hole sensing in oil & gas well, pipeline monitoring, or hot spot detection in industrial applications. The sensing probes are made out of telecommunication grade optical fibers cabled and deployed in the various applications.

Optical fibers used in communication systems are either single mode or multi mode. All optical fibers have a core and a cladding, and the core is normally 6-9 μm in diameter for single mode fibers or 50 μm and higher for multimode fibers while the diameter of the cladding is around 125 μm. Single mode fibers are normally step index fibers, i.e. the refractive index in the fiber core is different from the refractive index in the cladding to satisfy the light guiding conditions in Snell's law. The core of the single mode fiber can as the name implies only guide a single mode of the light traveling in the fiber. This will minimize dispersion and maintain a high bandwidth in the fiber.

Multi mode fibers can as the name implies carry multiple modes of light in the fiber. Multiple modes in a step index fiber causes signal dispersion as the different modes in the fiber can travel in many different paths and thereby reaching the receiver at different time. The way to mitigate signal dispersion in a multimode fiber is to introduce a graded index profile, which forces the various modes to travel with basically the same effective speed in the fiber. The better the graded index profile is optimized, the higher the bandwidth is in the graded index fiber.

The host material in optical fibers is fused silica, i.e. both the core and the cladding is mainly fused silica. The variations in refractive index are achieved by introducing various chemical, or dopants, in different concentrations during the fiber manufacturing process. The dopants and manufacturing methods are optimized for telecommunication type applications.

Optical fibers have been known to degrade rapidly when deployed in harsh environments like oil & gas wells where the temperature and pressure may be significantly higher than most telecommunication applications. The down-hole environment may also have a number of different chemicals that may react with the dopants in optical fibers. Hydrogen in particular, has been known to create severe attenuation in optical fibers with germanium doped core regions via a phenomena called hydrogen darkening.

Pure silica core fibers provide benefits in application of Distributed Temperature Sensing (DTS) for downhole environments, which have high temperatures and pressures and also contain hydrogen gases. Pure silica core has less susceptibility to the attenuations related to hydrogen darkening and lower transmission loss than conventional impurity-doped fibers. But the single mode version has issues of signal to noise ratio due to small light coupling and low Stimulated Raman Scattering threshold level due to its small core size.

The multi mode version could be a better solution. Multimode fibers typically have higher numerical apertures than single mode fibers. Higher numerical aperture means greater acceptance angles for input light into the fiber. Thus, fiber-to-fiber splices exhibit lower loss, fiber-to-device coupling is more efficient, and fiber-bending losses are lower. On the negative side, multimode fiber systems have an issue of higher inter modal dispersion (IMD), which broadens the input light signal. When an optical pulse is launched into a fiber, the energy in the pulse is distributed over all the propagating modes of the fiber. Each of the propagating modes travels at a slightly different speed along the fiber. As a result, the launched pulse is broadened significantly along the length of fiber. In distributed temperature sensing systems, this affects one of the critical parameters mentioned before—the spatial resolution, which is determined by the width of input pulse. When the pulse spreads more along distance, the spatial resolution determined by the pulse width is degraded more.

For downhole applications then, or any application in which reaction with typical dopants can create severe attention issues there is an important need for an optical fiber system that provides effective numerical aperture, temperature resolution, and spatial resolution in the presence of a high temperature/pressure hydrogen environment.

BRIEF SUMMARY OF THE INVENTION

The advantage of the current invention is a sensing fiber that provides optimum values of core size and numerical aperture to enhance temperature resolution, and spatial resolution in the presence of hydrogen environments.

The need is met with a step index multi-mode optical fiber distributed temperature sensor for providing optimum numerical apertures, temperature resolutions, and spatial resolutions in the presence of hydrogen environments by including at least a pure silica core portion of diameter $2a$ having a first refractive index $n_1$; a cladding layer with dopants of diameter $2b$, with $b>a$ having a second refractive index $n_2$; wherein the multimode fiber satisfies relations of: $0.03 \leq \sqrt{n_1^2 - n_2^2} \leq 0.10$ and 30 μm $< 2a < 50$ μm.

In another aspect of the invention the need is met with a step index multi-mode optical fiber distributed temperature sensor for providing optimum numerical apertures, temperature resolutions, and spatial resolutions in the presence of hydrogen environments by including at least a pure silica core portion of diameter $2a$ having a first refractive index $n_1$; a cladding layer with dopants of diameter $2b$, with $b>a$ having a second refractive index $n_2$; wherein the multimode fiber satisfies relations of: $0.04 \leq \sqrt{n_1^{2} - n_2^{2}} \leq 0.111$ and 20 μm $< 2a < 30$ μm.

In another aspect of the invention the need is met with a step index multi-mode optical fiber distributed temperature sensor for providing optimum numerical apertures, temperature resolutions, and spatial resolutions in the presence of hydrogen environments by including at least a pure silica core portion of diameter $2a$ having a first refractive index $n_1$; a cladding layer with dopants of diameter $2b$, with $b>a$ having a second refractive index $n_2$; wherein the multimode fiber satisfies relations of: $\sqrt{n_1^{2} - n_2^{2}}$ and 12 μm $< 2a < 20$ μm.

This invention introduces systems that optimize the pure core silica fibers for distributed temperature sensing in downhole applications. This system designs provide good choices in coupling power, temperature resolution, and spatial resolution. Adjusting the index difference between the core and the cladding as well as adjusting the size of the fiber core control reduction of modal delay.

In addition the use of offset launching or mode-scrambling techniques can selectively launch the lower order modes thus significantly further IMD.

BRIEF DESCRIPTION OF THE DRAWINGS

For a more complete understanding of the present invention, reference is now made to the following drawings, in which.

DETAILED DESCRIPTION OF THE INVENTION

Figure 1:
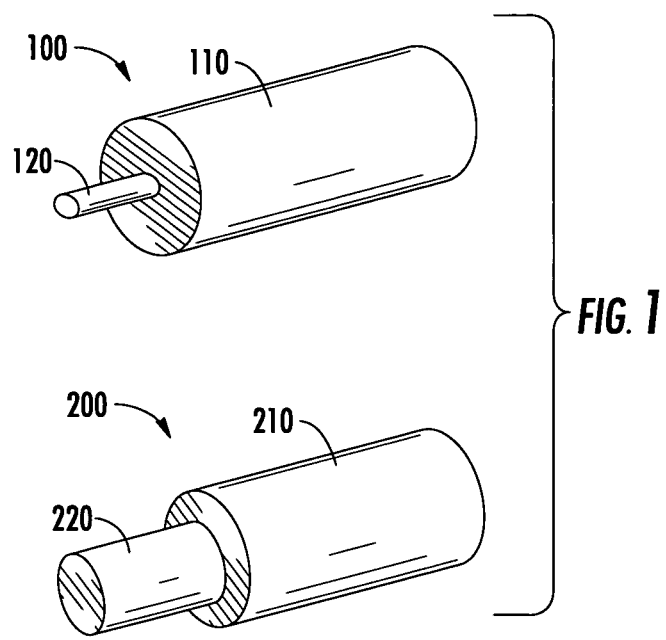
FIG. 1 shows a representation of prior art optical fibers system.

The instant invention can best be understood by first reviewing some of the basic relationships occurring in multimodal fibers. The normalized frequency V in a multimodal fiber determines the total number of guided modes of a step index (SI) fiber and is defined as:

$$V = \frac{2\pi a}{\lambda} \cdot \sqrt{n_{core}^2 - n_{cladding}^2} = \frac{2\pi a}{\lambda} \cdot NA \quad (1)$$

where $\lambda$ is the vacuum wavelength, a is the radius of the fiber core, and NA is the numerical aperture. When the V number is below 2.405, the fiber supports only one mode, categorized as a single mode SM fiber. Multimode fibers usually have higher V numbers.

Numerical aperture (NA) is also an important parameter of an optical fiber. Higher numerical aperture means greater acceptance angles for input light into the fiber. Thus, fiber-to-fiber splices exhibit lower loss, fiber-to-device coupling is more efficient, and fiber bending losses are lower.

Related to the normalized frequency is the number of supported modes N in a step index fiber, which for large V values can be approximated by:

$$N = \frac{V^2}{2} \quad (2)$$

In addition, in step index multimode fibers the spatial resolution is strongly related to inter modal delay (IMD), which is dominated by different group delays of the guided modes. Inter modal delay is the arrival time difference, $\Delta\tau$, between the mode with the largest waveguide group delay and the least delay. This can be estimated from:

$$\Delta\tau = \frac{L}{c} \cdot (n_{core} - n_{cladding}) \cdot \left(1 - \frac{2}{V}\right) \quad (3)$$

where L is the length of the fiber, c the speed of light, n is the refractive index and V is the normalized frequency respectively.

It can be seen from these equations that in some applications like downhole drilling or production in which the presence of high temperatures and pressures in combination with hydrogen gas step index multimode optical fibers of pure silica core manufacture can provide the resistance to hydrogen darkening while still maintaining acceptable ranges of temperature and spatial resolution. In particular simultaneous reductions of cores sizes and index differences between the core and cladding in pure silica core step index multimode fibers can lead to a class of improved performance for these applications.

An example prior art step index multimode optical fiber has a 50 μm core with a $n_1$ of 1.46, and a $n_2$ of 1.445 with a $\lambda_o$ of 1 μm. From equations (1) and (2) this system would have a modal delay of 47 nanoseconds. For a 1-kilometer fiber this corresponds to a spatial resolution of about 4.7 meters, unacceptable in many practical applications.

It has been found however that new combinations (not currently available) of cores sizes and index differences between the core and cladding in pure silica core step index multimode fibers can lead to new distributed temperature sensors of much more interest in applications like downhole temperature systems.

In one embodiment the modal delay can be reduced to 14.9 nanoseconds, reducing the spatial resolution to 1.5 meters in a 1-kilometer fiber with the same core diameter as the above example by increasing the cladding index to 1.455.

In another embodiment the core diameter is decreased to 20 μm with a $n_1$ of 1.46, and a $n_2$ of 1.457. This combination results in a modal delay of 6.6 nanoseconds, reducing the spatial resolution to 0.66 meters in a 1-kilometer fiber.

Table 1 shows the results in normalized frequency V, numerical aperture (NA), dispersion delays (D), and spatial resolution (Res.) for four different combinations of core radius (a) and cladding refractive index ($n_2$) at a constant core refractive index $n_1$ of 1.46. The first row represents a fairly conventional step-index multi-mode fiber currently available. The remaining three are not available and represent possible embodiments of the instant invention. Practitioners needing to balance the need for a higher coupling power, and desired spatial and temperature resolutions have a number of options for designing these trade-offs. The alternate cladding refractive indices ($n_2$) can be provided with know cladding (only) dopants such as fluorides.

TABLE 1

| a μm | $n_2$ | V | NA | D (ns.) | Res. (m.) |
|---|---|---|---|---|---|
| 25 | 1.445 | 32.8 | 0.209 | 47 | 4.7 |
| 25 | 1.456 | 17.0 | 0.108 | 11.8 | 1.18 |
| 15 | 1.456 | 10.2 | 0.108 | 10.7 | 1.07 |
| 10 | 1.457 | 13.6 | 0.094 | 8.3 | 0.83 |
| 6 | 1.4584 | 2.6 | 0.068 | 1.2 | 0.12 |

FIG. 1 shows in the numeral 100 a conventional telecommunication single mode fiber. The cladding diameter 110 is typically about 125 μm. The core 120 typically runs from about 6 to 10 μm in diameter. At these core diameters the normalized frequency V is well below the threshold value (~2.4) for single mode performance.

Still in FIG. 1 the numeral 200 demonstrates conventional multimode fibers currently available. The cladding diameter is again about 125 μm, while the core diameter can be 50 μm or higher.

Figure 2:
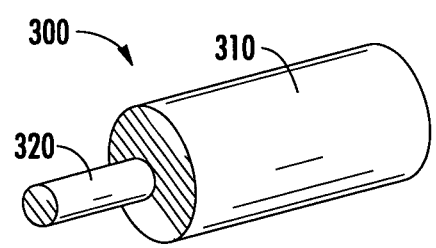
FIG. 2 shows a representation of the inventive optical fiber system.

FIG. 2, shown by the numeral 300 is a representation of a fiber sensor of the inventive concept. The difference from the prior art fibers of FIG. 1 is the diameter of the core 320, which is larger than conventional single modes fibers but smaller than multimode fiber to optimize the signal to noise ratio, which affects the temperature resolution and the spatial resolution.

To provide the enhanced signal to noise ratio, the desired temperature and spatial resolution needed for practical downhole applications the inventive design especially includes reducing the differences in refractive index of the core $n_1$ and the cladding $n_2$ as well as the core fiber diameter. In particular the numerical aperture $\sqrt{n_1^2 - n_2^2}$ is designed and manufactured to be between 0.03 and 0.12 (depending on the chosen core fiber diameter $2a$) and the core fiber diameter is designed and manufactured to be between 12 and 50 μm (depending on the chosen numerical aperture). These combinations are not available in current step-index multimode fibers. The actual chosen values of $n_1$, $n_2$ and the core diameter $2a$ are chosen based on particular applications and the relative importance of spatial resolution, temperature resolution, and coupling power.

The invention claimed is:

1. A step-index multi-mode optical fiber distributed temperature sensor for providing effective coupling power, temperature resolution, and spatial resolution in the presence of hydrogen environments comprising:
   a. a pure silica core portion of diameter $2a$ having a first refractive index $n_1$;
   b. a cladding layer of diameter $2b$ wherein b>a having a second refractive index $n_2$; and
   c. wherein said multi-mode fiber satisfies relations of:
      i. $0.03 \leq \sqrt{n_1^2 - n_2^2} \leq 0.10$; and
      ii. 30 μm<2a<50 μm.

2. A step-index multi-mode optical fiber distributed temperature sensor system for providing effective coupling power, temperature resolution, and spatial resolution in the presence of hydrogen environments comprising:
   a. a pure silica core portion of diameter $2a$ having a first refractive index $n_1$;
   b. a cladding layer of diameter $2b$ wherein b>a having a second refractive index $n_2$; and
   c. wherein said multi-mode fiber satisfies relations of:
      i. $0.04 \leq \sqrt{n_1^2 - n_2^2} \leq 0.111$; and
      ii. 20 μm<2a<30 μm.

3. A step-index multi-mode optical fiber distributed temperature sensor system for providing effective coupling power, temperature resolution, and spatial resolution in the presence of hydrogen environments comprising:
   a. a pure silica core portion of diameter $2a$ having a first refractive index $n_1$;
   b. a cladding layer of diameter $2b$ wherein b>a having a second refractive index $n_2$; and
   c. wherein said multi-mode fiber satisfies relations of:
      i. $0.065 \leq \sqrt{n_1^2 - n_2^2} \leq 0.12$; and
      ii. 12 μm<2a<20 μm.

\* \* \* \* \*

UNITED STATES PATENT AND TRADEMARK OFFICE
CERTIFICATE OF CORRECTION

PATENT NO.        : 8,414,186 B2
APPLICATION NO.   : 12/451866
DATED             : April 9, 2013
INVENTOR(S)       : Chung Lee et al.

It is certified that error appears in the above-identified patent and that said Letters Patent is hereby corrected as shown below:

In the Specification

In column 2 line 57 the formula should read:

$$0.04 \leq \sqrt{n_1^2 - n_2^2} \leq 0.111$$

In column 2 line 67 the formula should read:

$$0.065 \leq \sqrt{n_1^2 - n_2^2} \leq 0.12$$

In the Claims

In column 6 line 15 claim 2 the formula should read:

$$0.04 \leq \sqrt{n_1^2 - n_2^2} \leq 0.111$$

In column 6 line 26 claim 3 the formula should read:

$$0.065 \leq \sqrt{n_1^2 - n_2^2} \leq 0.12$$

Signed and Sealed this
Twenty-sixth Day of November, 2013

Margaret A. Focarino
*Commissioner for Patents of the United States Patent and Trademark Office*